United States Patent [19]

Hendry

[11] 4,389,358

[45] Jun. 21, 1983

[54] METHOD AND APPARATUS FOR MAKING AN INTEGRAL STRUCTURAL CELLULAR AND NON-CELLULAR PLASTIC OR RESINOUS ARTICLE WITH A SMOOTH OUTER SURFACE

[75] Inventor: James W. Hendry, East Detroit, Mich.

[73] Assignee: KMMCO Structural Foam, Inc., East Detroit, Mich.

[21] Appl. No.: 276,443

[22] Filed: Jun. 22, 1981

[51] Int. Cl.³ .................. B29D 27/00; B29F 1/05; B29F 1/10

[52] U.S. Cl. .................. 264/45.1; 264/40.4; 264/46.6; 264/50; 264/53; 264/54; 264/250; 264/328.7; 264/328.8; 264/328.19; 264/DIG. 83; 425/4 R; 425/125; 425/127; 425/129 R; 425/558; 425/560; 425/562; 425/572; 425/588; 425/590; 425/817 R

[58] Field of Search .................. 264/45.1, 46.6, 46.1, 264/328.12, DIG. 83, 40.4, 50, 53, 54, 250, 328.7, 328.8, 328.19; 425/543, 4 R, 125, 127, 129 R, 558, 560, 562, 572, 588, 590, 817 R

[56] References Cited

U.S. PATENT DOCUMENTS

| | | | |
|---|---|---|---|
| 3,466,700 | 9/1969 | Harrison | 264/46.6 X |
| 3,773,451 | 11/1973 | Bielfeldt et al. | 425/147 |
| 3,793,416 | 2/1974 | Finkmann et al. | 264/DIG. 83 |
| 3,956,438 | 5/1976 | Schippers | 264/46.1 |
| 4,067,673 | 1/1978 | Hendry | 264/DIG. 83 |
| 4,124,308 | 11/1978 | Sokolow | 264/328.12 X |
| 4,155,969 | 5/1979 | Hendry | 264/45.1 |
| 4,238,181 | 12/1980 | Dannels et al. | 425/543 |
| 4,309,163 | 1/1982 | Cottancin | 264/328.7 X |

*Primary Examiner*—Philip E. Anderson
*Attorney, Agent, or Firm*—Cullen, Sloman, Cantor, Grauer, Scott & Rutherford

[57] ABSTRACT

A method and apparatus is provided for making a composite structural homogeneous resinous article having (a) a smooth, shiny non-cellular or homogeneous relatively thin injection compression molded liner on the outer surface and (b) a cellular relatively thicker injection molded core integral with the molded liner. One extruder is connected by valve controlled passages to a pair of injection devices, each device having an injection chamber. One chamber stores the homogeneous plastic resin and the other chamber stores the foam plastic resin. A first mold assembly having a movable upper mold part and a stationary lower mold part form a cavity, with a gap opening, at a first molding station. The cavity is in communication with the first injection chamber. A second mold assembly having a second cavity, which is closed, is provided at the second molding station and is formed by the aforementioned movable upper mold part of the first mold assembly, which is transferred thereto, and with another stationary lower mold part. The second cavity is in communication with the second injection chamber. Controls are provided for insuring the correct amount of each resin to be extruded and stored in the injection chambers. Fluid operated means are provided for energizing the first injection device to inject the homogeneous plastics material therein into the first mold cavity. This is followed automatically by rapidly applying a compressive force to the first mold assembly to compression mold the relatively thin injection compression molded liner. Thereafter the upper mold part of the first mold assembly, with the molded liner retained therein, is transferred to the second molding station and immediately the stored foam resinous material is injected into the second mold cavity to form with the solid liner the composite homogeneous-foam plastic article having an integral relatively thin, smooth, shiny and homogeneous molded outer surface.

18 Claims, 5 Drawing Figures

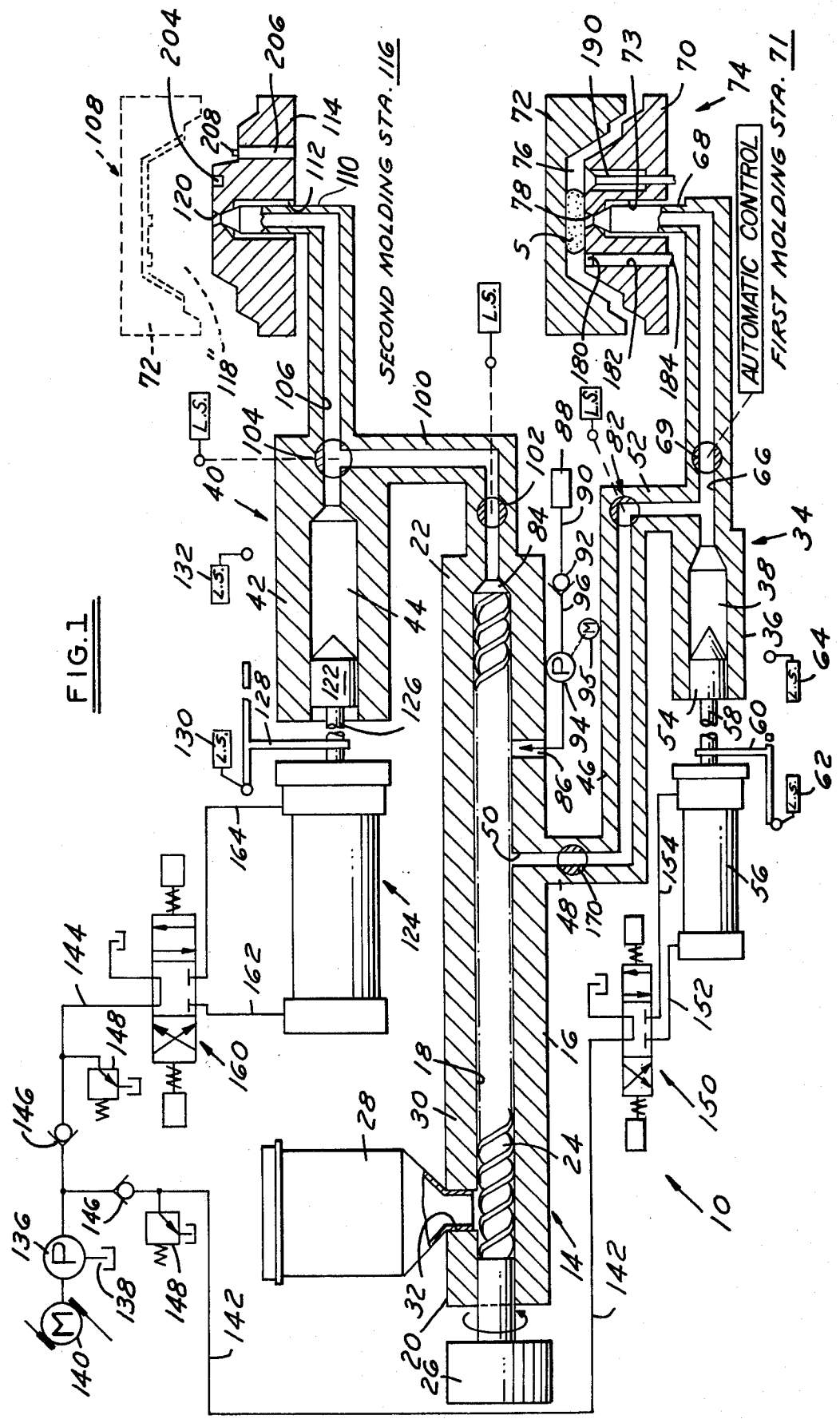

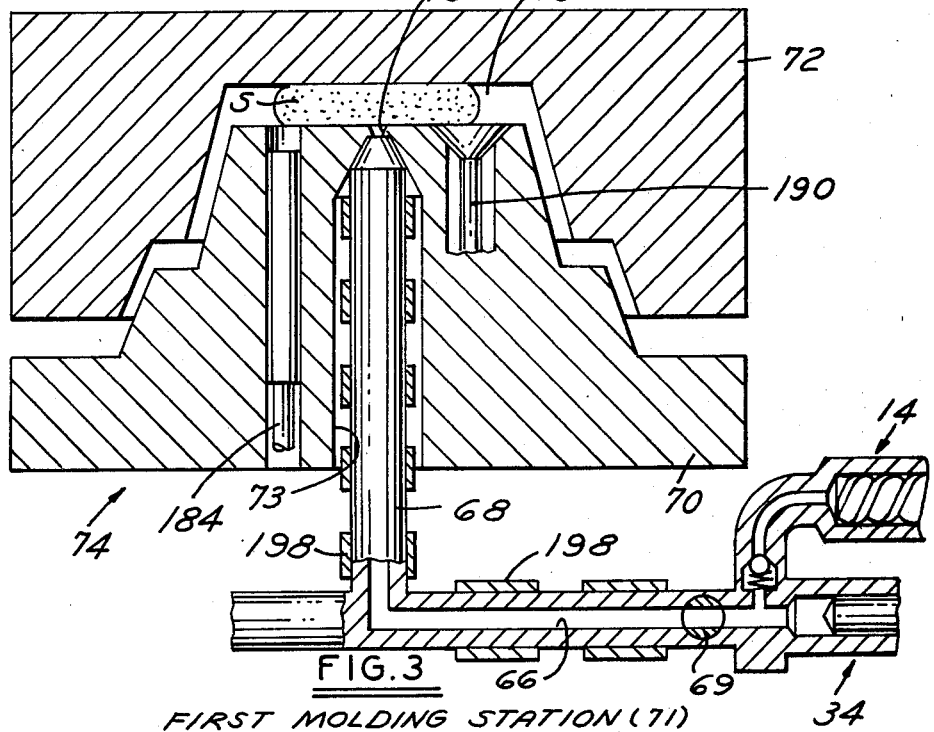
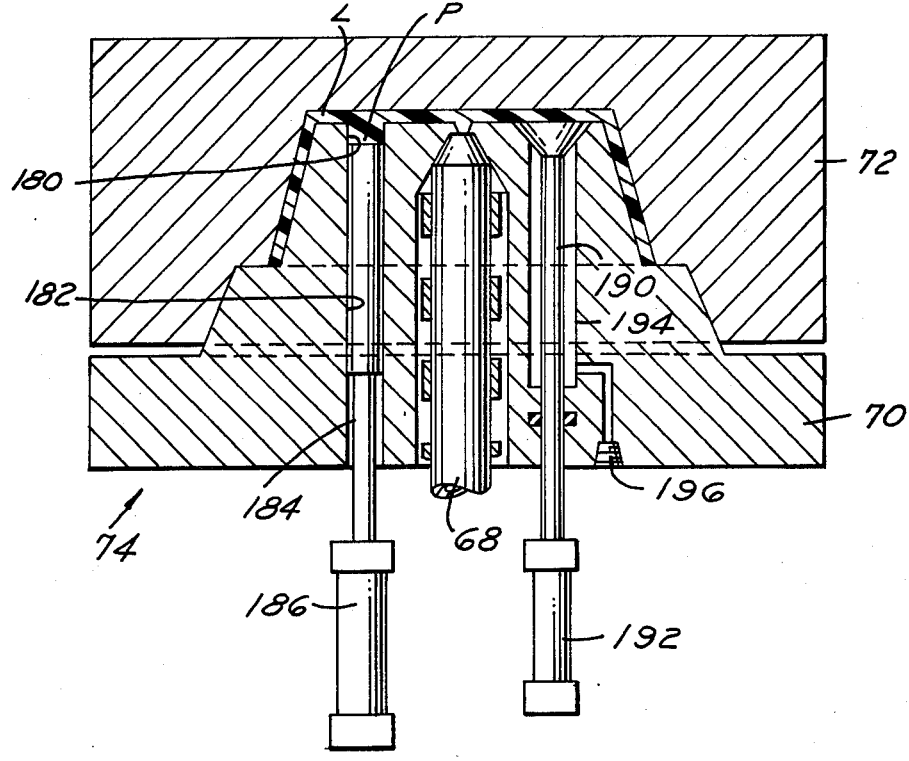

SECOND MOLDING STATION (116)

METHOD AND APPARATUS FOR MAKING AN INTEGRAL STRUCTURAL CELLULAR AND NON-CELLULAR PLASTIC OR RESINOUS ARTICLE WITH A SMOOTH OUTER SURFACE

BACKGROUND OF THE INVENTION

1. Field of the Invention

This invention relates to the method and apparatus for the manufacture of structural foam parts, bodies or articles in a multi-stage molding operation, with the article manufactured characterized by a dense, smooth, shiny, homogeneous and relatively thin molded plastic liner or skin formed at one molding station and a relatively thicker injection molded foam plastic inner structure or core integral with the smooth solid molded liner at another molding station. The same basic plastic or resin material may be used to form the composite liner and core or different resinous materials may be used to form the composite article. The thicker molded foam plastic core may optionally be formed by compression molding.

2. Description of The Prior Art

The manufacture of composite bodies has been carried out heretofore utilizing a number of different methods and apparatuses. Such bodies have been formed utilizing a number of successive operations or in a single operation. Typical prior art patents include my own U.S. Pat. Nos. 4,067,673 entitled "Apparatus For Injection Foam Molding" dated Jan. 10, 1978 and 4,155,969 entitled "Method For Injection Molding" dated May 22, 1979. Such patents disclose a process and apparatus utilizing or consisting or a single extruder and a single injection chamber where the homogeneous and foam plastic resin are extruded and stored until shot sequentially into the same mold by hydraulic pressure. The prior art cited during the prosecution of the aforementioned patents disclose various structures and methods for forming a resinous part having generally a low-density plastic core material or filler protected by a high density substantially fluid impermeable or solid skin which provides a smooth external surface of aesthetic and protective value.

All of the methods and apparatuses which have been proposed have certain disadvantages in commercial use. Some of the problems include reproduceability of the article, non-uniformity of the outer liner or surface of the article and non-uniform density of the inner core material or structure. It has been further difficult in the past to control the skin thickness and the plastic flow in the mold and therefore the skin thickness has varied from one molding shot or cycle to the next.

SUMMARY OF THE PRESENT INVENTION

It is a feature of the present invention to provide a method and apparatus for making a structural foam plastic part or article having a Class A finish or surface, with the article having a dense, non-cellular or homogeneous relatively thin injection compression molded liner on the outer surface of the article and with the inner core consisting of a cellular, relatively thicker injection molded structure. The characteristic of the outer surface of the molded article is that it is solid or homogeneous, shiny, smooth, dense, thin, and of uniform thickness throughout its entire extent. Such liner or shell has a skin thickness in the amount of twenty to twenty-five thousandths of an inch. As an option the inner core may also be compression molded.

Another feature of the present invention is to provide in the mold assembly a release structure whereby the excess of the solid plastic material injected into the mold assembly is relieved or directed away from the mold cavity thus insuring that the proper amount of plastics material is available in the mold cavity to form the molded skin of required thickness.

Another feature of the present invention is to provide a method and apparatus using two different plastics or resinous materials, one plastic being extruded and injected by a first extruder and injection unit to form the dense homogeneous plastic liner or shell and the other extruder and injection unit used to form the cellular or less dense inner core or structure of the molded article.

It is a further feature of the present invention to provide an apparatus for making a composite structural homogeneous-foam article, with the apparatus including an extruder means for heating and plasticating a plastic material while simultaneously causing the plastic material to travel through the main passageway from one end toward the other end. The apparatus includes first and second injection means, each including an injection chamber one for receiving solid plastics material and the other for receiving a foam plastics material. A first passage connects the main passageway to the homogeneous plastics injection chamber while a second passage connects the extruder to the foam plastic injection chamber. Means are provided for introducing a gas emitting agent into the main passageway where the gas mixes with the molten plastic material to form the foam plastics material.

A first mold assembly is provided having a movable and transferable upper mold part and a stationary lower mold part forming a first mold cavity. The mold assembly or a plurality of assemblies are located in a vertical press. Means including a valve connect the first homogeneous plastic injection chamber to the first mold cavity. A second mold assembly located in a vertical press is formed by the aforementioned transferable upper mold part and another stationary mold part located at a different molding station and together form a second mold cavity. The second mold assembly may be located in a different vertical press or the same press may be utilized with both or a plurality of mold assemblies. Fluid operated means are provided for energizing the first injection means to inject the solid plastics material therein into the first mold cavity. Rapidly thereafter a compressive force is applied by the press to the first mold assembly to form the relatively thin injection compression molded liner or skin.

The press or apparatus includes means for transferring the upper mold part, with the molded plastic liner therein, to the second mold station. Thereafter fluid operated means are energized for ejecting the foam plastics material into the second mold cavity. As an optional feature a compressive force may be applied to the second mold assembly. Regardless of whether a compressive force is applied, a cellular relatively thicker injection molded inner structure or core is formed which is integral with the aforementioned molded liner to provide the resulting article.

Still another feature of the present invention is to provide a method of making a composite structural homogeneous-foam resinous part utilizing the extruder, the first and second injection chambers and the first and second mold assemblies which include the steps of transferring a homogeneous non-cellular resinous material from the plasticating extruder means to the first injection chamber and thereafter transferring a foamable resinous material from the extruder means into the second injection chamber. Another step includes establishing communication by a first valve between the first injection chamber and a first mold assembly having upper and lower mold parts forming the first cavity at the first molding station. The next steps require opening the first valve and injecting the non-cellular resinous material into the first cavity of the first mold assembly and immediately thereafter applying a compressive force to the first mold assembly at the first molding station to distribute the solid non-cellular resinous material throughout the first cavity to form the smooth, shiny non-cellular relatively thin outer liner.

The method further includes the step of transferring the movable upper mold part from the first station, carrying the smooth non-cellular relatively thin outer liner, to the second molding station where the upper mold part forms with another lower mold part a second mold assembly having a second mold cavity therein. Immediately thereafter establishing communication by a second valve between the second injection chamber and the second mold cavity at the second molding station and injecting the foamable cellular resinous material from the second injection chamber into the second mold cavity. Finally, as an optional step, the method includes applying a compressive force at the second molding station to the second mold assembly to further distribute the foamable cellular resinous material throughout the second mold cavity to form the cellular relatively thicker inner structure integrated with the smooth, shiny non-cellular outer liner.

BRIEF DESCRIPTION OF THE DRAWINGS

FIG. 1 is a schematic drawing of the apparatus, hydraulic circuit and mold assemblies, capable of forming a homogeneous-foam-plastic article at first and second molding stations;

FIG. 2 is a sectional view through the mold assembly at the first molding station and showing the injection of the homogeneous plastics material;

FIG. 3 is another sectional view through the mold assembly at the first molding station and showing additional details of the lower mold part construction and the molding of the smooth homogeneous plastic liner upon application of a compressive force to the mold assembly;

DETAILED DESCRIPTION OF THE PREFERRED EMBODIMENT

Figure 4:
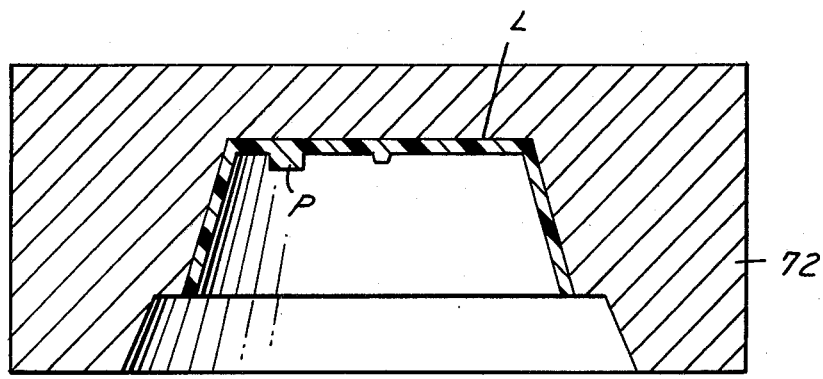
FIG. 4 is a sectional view through the transferable upper mold part, with the formed plastic liner held therein.

FIG. 1 illustrates a molding apparatus and method utilizing operational steps in the process of plasticizing or melting plastic or thermoplastic material in a screw and barrel assembly, while drawing from the screw and barrel assembly at one discharge port solid plastics material and at the other discharge port foam plastics material. The molding apparatus is designed to mold a composite structural or homogeneous-foam resinous or plastic article having an integral relatively thin, non-cellular, smooth outer liner or surface L and a cellular or foam plastic or resin inner core or structure C during a cycle of operation of the screw member.

The apparatus 10 has a hydraulic circuit 12 and includes at least one extruder 14 in the form of an elongated barrel member 16 having an elongated chamber or main passageway 18 therein extending from one end 20 of the barrel member 16 to the other or forward end 22. An elongated screw member 24 is located within the main passageway or chamber 18 and is rotated therein by drive means 26 of any conventional type as is well known in the art. A hopper 28 containing solid plastic pellets is mounted on the wall 30 of the extruder 14 and is connected to the main passageway 18 via the port or opening 32 provided in the wall 30 of the barrel 16 surrounding the main passageway 18. The solid plastic pellets are introduced into the heated main passageway 18 via the hopper 28 in a conventional manner well known in the art. The pellets are advanced towards the forward end 22 by the resistance heat on the barrel member 16, frictional heat generated by rotation of the screw member 24 and by the back flow across the flights of the screw which melt the pellets in what is referred to herein as the melt, melting or heating zone or area of the screw and barrel assembly.

The apparatus 10 includes a first injection means or device 34 including a housing 36 having therein a solid or non-cellular plastic injection chamber 38.

The apparatus 10 further includes a second injection means or device 40 including a housing 42 having a foam or cellular plastics injection chamber 44. A second extruder may be provided for the second injection means.

A first passage or conduit or line 46 is connected on one end 48 to a discharge port 50 provided in the barrel member 16 at the melt zone of the main passageway 18 at a place between the end portions 20 and 22 of the main passageway 18 as shown. The passage or conduit 46 is connected on the other end 52 to the housing 36 and communicates with the solid plastic injection chamber 38.

The first injection device 34 includes a plunger 54 which is located within the solid or non-cellular plastics injection chamber 38. The plunger 54 is mechanically connected to a double acting fluid responsive piston and cylinder device 56 which has a piston rod 58 attached to the plunger 54 for operating same and to thereby store or discharge the solid plastics material from chamber 38. The double acting fluid responsive cylinder device 56 is connected in the hydraulic circuit 12 as will be hereinafter described. The piston rod 58 carries a limit switch actuator or arm 60, which is designed to operate the limit switches 62 and 64 as will be hereinafter described.

The first injection device 34 includes a passage or manifold 66 terminating in a nozzle 68. A valve 69 is provided in passage 66 or in the nozzle 68 for controlling flow. The nozzle 68 extends upwardly through the center of a stationary lower mold part 70 located in a vertical press at a first molding station 71. A transferable and movable upper mold part 72 forms with the stationary mold part 70 the first mold assembly 74 having a first mold cavity 76, with a gap opening therein as illustrated in FIG. 2. Specifically, the mold nozzle 68 is received in the center opening or bushing 73 provided in the stationary lower mold part 70. A sprue or passage 78 is located in the lower mold part 70 of the assembly 74, with the sprue or passage 78 leading into the first mold cavity 76 within the interior of the first mold assembly 74. The mold assembly 74 could include a distribution manifold by which the homogeneous plastics material from the extruder 14 is directed into a plurality of nozzles for supplying a mold assembly from a plurality of gates. Such would be conventional design for supplying relatively large mold assemblies. If the apparatus is used for filling molds of relatively smaller size, a fewer number of gates or nozzles leading to the mold assembly would be provided.

Referring once again to FIG. 1, line 46 is connected to the screw and barrel assembly at a point where complete melting of the plastic pellets occur. Thus a portion of the molten plastics material is directed through the discharge port 50, through passage or line 46, across the multi-directional solid injection flow valve 82 provided in line 46 and controlled by a limit switch as will subsequently appear, to the homogeneous plastics injection chamber 38 where the homogeneous plastics material is stored in a measured amount equal or greater than the volume of the outer plastic liner to be molded in the mold assembly 74. When the measured amount or a slightly greater amount of homogeneous plastics material is accumulated, as determined by the limit switch setting, the valve 82 is closed.

Simultaneously with the above described operational steps, the molten plastics material continues advancing along the screw member 24 from barrel port 50 towards the other end 22 of the barrel member 16 where a second discharge port 84 is located. However as the molten plastics advances along the screw 24, a gas or a gas emitting or producing agent in solid or liquid form is introduced into the main passageway 18 downstream of the homogeneous plastics discharge port 50 in the zone or area of the extruder 14 referred to herein as the melt and gas mixing zone of the main passageway 18.

Thus the apparatus 10 has a gas injection port 86 provided in the barrel wall 30 downstream of discharge port 50. A source of a gas emitting liquid or a source of an inert gas 88 is connected by a line 90 having a check valve 92 therein to the suction side of a gas or liquid pump 94, diagrammatically shown. The discharge or pressure side of pump 94 is connected by a hose, line or conduit 96 to the gas port 86. Any number of inert gases may be used, with nitrogen gas being the one conventionally utilized in the art. Thus as the molten plastics material advances past the gas port 86, it is injected with a series of small gas bubbles which mixes with the molten plastics material introduced therein by the variable volume liquid or gas pump 94. This occurs in the melt and gas mixing zone of the extruder and results in a generally uniform mixture of gas and plastic material being moved through the second discharge port 84. The gas is introduced under high pressure.

The second injection device 40 is connected to the discharge port 84 of the extruder 14 by a line, conduit or manifold passage 100. A limit switch controlled extruder or directional control valve 102 is provided in line 100. The line or passage 100 leads to the housing 42 having the foam plastics chamber 44 therein, with a limit switch controlled multi-position control valve 104 being provided in passage 100 to direct plastics flow first into the chamber 44 and then, when the foam plastics material is ejected from chamber 44, into the second mold assembly 108 for making foam plastics material parts.

The housing 42 of the second injection means or device 40 has a manifold line, conduit or passage 106 connected thereto by a vertical injection nozzle 110 located on the center opening 112 of the second stationary lower mold part 114. The first mentioned movable upper mold part 72 is transferred or moved to the second molding station 116 after the plastic liner, to be described, is formed and defines with the stationary mold part 114 the second mold assembly 108 having a second mold cavity 118 therein in which the composite article to be formed is completed. This transfer step will be described later in the specification. FIG. 1 shows the movable mold 72 in dotted lines at station 116. The second mold assembly 108 includes a sprue or passage 120 aligned with the nozzle 110, with the sprue 120 leading from the injection nozzle to the cavity 118. The nozzle 110 is provided with a restricted plastic or flow valve, as is conventional in the art, which cooperates with the sprue 120 provided in the second mold assembly 108. It should be appreciated that the mold assembly 108 just described may have a suitable distribution manifold by which foam plastic material from line or conduit 106 is directed into a plurality of nozzles for supplying the mold assembly 108 in a conventional manner. It should further be understood that the injection device 40 may be used with large molds as well as with relatively small molds, with the conduit or line 106 communicating through a plurality of gates with the mold assembly required to produce the article.

Located within the interior of the second foam plastic injection device 40 is a plunger 122 which is controlled by a fluid responsive double acting piston and cylinder device 124. The device 124 includes a piston rod 126 connected to the plunger 122. A limit switch actuator or arm 128 is carried by the piston rod 126 and is adapted to operate first one and then the other of the limit switches 130, 132 to fill the chamber 44 with a measured amount of the material corresponding generally to or slightly exceeding the molded weight of the part to be formed and thereafter to eject same from the chamber 44. The fluid responsive cylinder 124 is interconnected in the hydraulic circuit 12 as will subsequently be described.

Therefore, after the inert gas has been mixed with the plastic material in the melting and mixing zone of the extruder 14 the foam plastics material is discharged through the port 84 and when the valves 102 and 104 are open such material is directed in the measured amount into the foam plastic injection chamber 44. At such time the valve 104 prevents the material from being directed into the conduit or manifold 106 which leads to the second mold assembly 108. Again as in the case of the first injection device 34 when the desired volume or weight of foam plastic material is accumulated within the chamber 44 through the limit switch setting of the valve 102, the latter mentioned valve 102 closes. As a result thereof, the rotating screw member 24 stops rotating and the variable liquid or gas pump 94 is also de-energized and stops.

The mold assemblies 74 and 108 may be located in a single vertical press or each may be located in a separate vertical press; however, with the construction heretofore described, with each extruder cycle one composite solid-foam plastics article is produced.

The hydraulic circuit 12 for the apparatus 10 includes a hydraulic pump 136 having a reservoir or tank 138. The pump 136 is driven by an electric motor 140. The hydraulic circuit 12 includes a pair of passages or conduits 142 and 144, each being connected to the discharge side of the pump 136. Each passage 142, 144 contains a check valve 146 and safety pressure relief valve 148. Automatic controls are provided for operating the extruder 14 intermittently.

Included within the hydraulic circuit 12 and in particular in passage or conduit 142 is a four-way solenoid operated directional control valve 150 which is in turn connected by a pair of hydraulic conduits 152 and 154 to opposite ends of the double acting hydraulic piston and cylinder device 36. The conduit 142 may be connected through valve 150 to either the tank or reservoir 138 or to one or the other ends of the hydraulic cylinder 56 as diagrammatically illustrated.

The passage of conduit 144 also contains a four-way solenoid operated directional control valve 160. Thus, hydraulic fluid in line 144 may be directed through the valve 160 to tank 138 or to one of the other ends of the hydraulic cylinder 124 in generally the same manner as has been explained previously in connection with cylinder 56. Thus, one pressure port of valve 160 is connected by line 162 to one end of the cylinder 124 while the other pressure port is connected by line 164 to the other end of the cylinder 124 as viewed in FIG. 1.

When it is required to replenish the solid plastic in chamber 38, the limit switch controlled valve 82 automatically opens to connect the passage or melt pipe 48 and chamber 38 with the first discharge port 50 of the extruder 14 to supply solid plastics material to chamber 38. At such time the hydraulically actuated plunger 54 is moved to the left as viewed in FIG. 1 creating an expanding chamber 38 until actuator arm 60 trips limit switch 62 which signals that the required amount or weight of solid plastics material has entered chamber 38. Thus the actuation of switch 62 is effective to close valve 82 indicating that a measured amount of solid plastics material is in chamber 38.

Simultaneously, the screw member 24 is discharging foam plastics material from the barrel via port 84 into chamber 44 through limit switch controlled valves 102 and 104. The hydraulically actuated plunger 122 is moved to the left as viewed in FIG. 1, expanding chamber 44, until the actuator or arm 128 trips limit switch 130 indicating the measured capacity of foam plastics material has been reached in chamber 44 and closing the limit switch controlled valves 104 and 102. Thereafter both the screw drive mechanism 26 and the pump 94 are automatically stopped and everything goes to zero.

When the first mold assembly 74 at station 71 is ready to accept the homogeneous or cellular plastics material the valve 82 is automatically turned to a different position. Hydraulic fluid in line 154 is effective to move the plunger 54 to the right as viewed in FIG. 1 to drive the solid or non-cellular plastics material S across valve 69 and nozzle 68 into the first cavity 76 of mold assembly 74 as shown in FIGS. 1 and 2. At such time actuator arm trips limit switch 64 for a purpose which will subsequently be described.

Once the material S stored in injection chamber 38 has been ejected therefrom into the first mold cavity 76, the vertical press, not shown, at the first molding station 71 receives an automatic signal to rapidly close the mold assembly 74 as shown in FIG. 3. This signal occurs almost instantaneously upon the filling of the mold cavity 76. A compressive force is exerted immediately by the press to distribute the solid plastics material S uniformly throughout the closed cavity 76 to form or make a relatively thin, smooth liner, skin or shell L having a thickness of 0.020 to 0.025 of an inch. Since it is generally impossible to get the exact amount of solid material S ejected from chamber 38 during each cycle of operation the injection chamber 38 is programmed to eject a larger amount or volume of material S into cavity 76. It is therefore necessary to incorporate in the lower mold part 70 an overflow zone or area 180 in communication with cavity 76. The mold part 70 includes an elongated straight passage 182 having therein a pin or rod 184 which is backed up by a hydraulic or pneumatic air cylinder 186. When the pressure generated in the cavity 76 exceeds the pre-set back-up pressure of the fluid operated cylinder 186, the rod 184 is depressed or lowered in the mold part 70 as a result of the overflow or excess plastic which flows into the zone or area 180 as shown in FIG. 3. Thus a round plastic projection P is formed on the inner surface of the molded thin liner or shell L and this represents the excess plastic injected in cavity 76. The hydraulic cylinder 186, as an example, may be part of the hydraulic circuit for the press.

The upper mold part 72 is rapidly closed by the press to close the gap opening 76 shown in FIG. 2 so that the liner L is actually compression molded, with the excess plastic being relieved via the material overflow zone 180 or relief valve, pin and cylinder construction described previously.

The lower mold part 70 is further provided with a conventional air operated poppet or valve 190 attached to an air or fluid cylinder 192. The housing 194 of poppet 190 has the usual air blow off passage 196 exiting from the bottom of the stationary mold part 70. The purpose of the air operated poppet 190 is to assist in the separation of the mold parts 70 and 71 and to forcibly urge the liner L against the movable upper mold part 72 as the latter is transferred to the second molding station 116. Once liner L has been formed the pressure or compressive force on the mold assembly 74 is automatically relieved and the assembly 74 is automatically opened, with the air operated poppet or valve construction 190 being automatically energized to direct a stream of air towards the liner L to retain it in the cavity of the transferable upper mold part 72. Thus the mold part 72 is separated from the stationary mold part 70 automatically as is represented in FIG. 4 where the upper mold part 72 is shown in an intermediate transferred position.

The nozzle 68 and conduit or manifold 66 are provided with a plurality of conventional heater bands 198 to maintain the nozzle and conduit heated thereby resulting in the plastic material remaining in a molten plastic condition as it is injected into the cavity 76.

Figure 5:
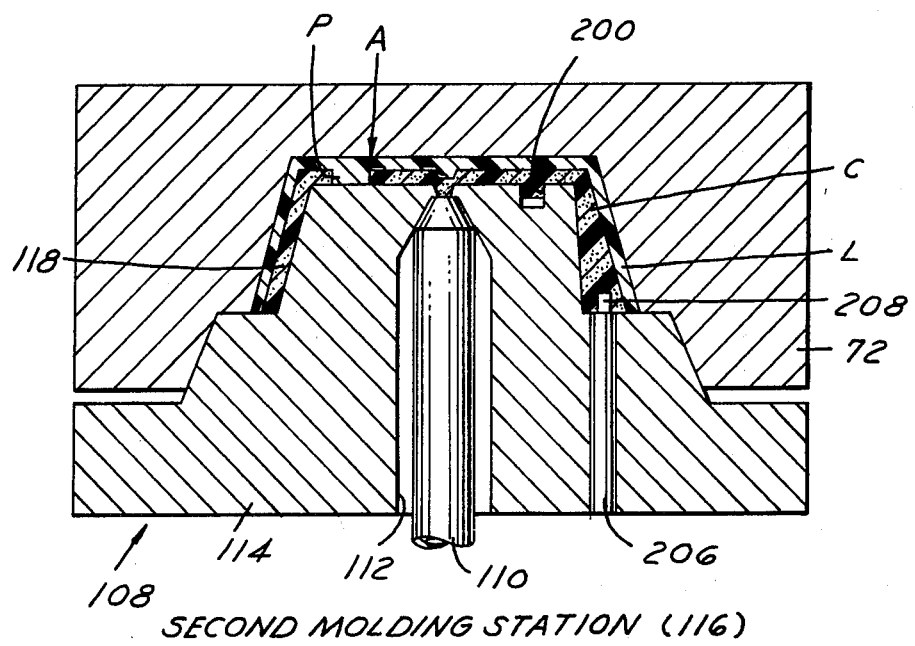
FIG. 5 is a sectional view through the mold assembly at the second molding station, showing details of the construction of the lower mold part and the molding of the inner core and liner to produce the finished article.

Automatic means, not shown, are provided for transferring the upper mold part 72, with the liner L therein, through the intermediate transfer position of FIG. 4 to the second molding station 116 as shown in FIG. 5.

The stationary lower mold part 116 at the second molding station 116, as an example, may be provided with an overflow zone or area 200 for excess foam or cellular material. The area 200 is in communication with the second mold cavity 118. A core pin 206 extends through the lower mold part 114 and is provided with a locator plug 208 which extends into the second mold cavity 118. After the upper mold part 72 is transferred to the second molding station 116 (FIG. 5) valve 104 opens automatically and hydraulic fluid in line 162 drives the plunger 122 to the right as viewed in FIG. 1 through passage 106 and nozzle 110 into cavity 118 of the second mold assembly 108. At the end of the stroke actuator or arm 128 trips limit switch 132 indicating that cavity 118 is filled with foam material.

As an alternative to filling the cavity 118 of the second mold assembly 108 solely by injection from chamber 44 a vertical press, not shown, may be used to compression mold the foam material within cavity 118 by rapidly and automatically closing the second mold assembly 108 to uniformly direct the foam or cellular material throughout the cavity 118 which contains at one side thereof the smooth thin skin or liner L of twenty to twenty-five thousandths of an inch in thickness. Regardless of whether the molding at the second molding station is accomplished by injection alone or by injection and compression, the article A (FIG. 5) is molded with the foam or cellular inner structure or core C integrated or integral with the smooth thin skin or liner L. Once the article A is formed, the pressure of the press (if used) is automatically relieved, and the mold assembly 118 is automatically opened. Conventional means are provided for ejecting the finished article A from the mold assembly 108. Once the article A is removed, the movable upper mold part 72 is automatically transferred to the first stationary mold part 70 at station 116.

After the above described operation has been completed or, as an example, five or ten seconds later, the previously actuated limit switches 132 and 64 signal the screw drive mechanism 26 and the pump drive means 95 for the pump 94 to restart or to begin operating and start another cycle for making homogeneous-foam plastics article A using the single screw member 24 (or two such members, one filling each cavity 38, 44, respectively).

The screw drive mechanism 26 and the pump drive means 95 are operated by conventional means including the limit switches 62, 64, 130 and 132. Thus, after both expanding cylinders 38, 44 have been filled to the required volume or weight, the actuator or switch arms will strike the limit switches 62 and 130 and stop the operation of the drive mechanism 26 and the pump drive means 95. As the plungers 54, 122 move to expel plastics material from their respective chambers 38, 44 and to direct it to the mold assemblies 74, 108, the limit switches 64 and 132 are actuated to restart the drive mechanism 26 and the pump drive means 95. The screw limit switches can control stopping and starting of the screw drive mechanism 26 as is conventional in the art and this includes the use of conventional electrical relay circuits. Also the pump limit switches can control stopping and starting of the pump drive means 95 through conventional electrical relay circuits. Since it requires slightly more time to stop the screw member 24, as well as to start it, than to start or to stop the pump 94, the limit switch causing the screw drive means 26 to stop will be actuated a short time period before the limit switch causing the pump drive means 95 to stop and for the same reason the limit switch causing the screw drive means 26 to start will be actuated slightly ahead or before the limit switch causing the pump drive means 95 to start. The order in which the aforementioned drive means or mechanisms are energized and/or deenergized (start and/or stop), and the time lag caused therebetween may be selected as required since such order of selection are matters of individual adjustments and operating conditions.

Thus it appears that the hydraulic circuit 12 is provided with a pump 136 and reservoir 138 to operate the first and second injection devices 34 and 40 sequentially. Such ejection devices each includes a plunger within the respective injection chamber and a double acting piston and cylinder device (56, 124) connected to each plunger for filling the chamber and discharging the plastic material therein. A solenoid operated four-way directional flow control valve (150, 160) is provided for each of the piston and cylinder devices (56, 124) in the hydraulic circuit 12 for delivering hydraulic fluid to and from the respective ends of the cylinder to control the filling and discharging of the plastics material from the respective chambers.

In the event that only from plastic parts are required, a shut off valve or control means 170 may be provided in the melt pipe or first passage means 48 adjacent the port 50 for closing same thereby preventing flow of solid plastics material to the first injection means 34 and for rendering the injection device 34 temporarily inoperative.

It should be appreciated that the completed structural solid-foam article A has a Class A finish which is shiny and smooth and is ready for use in certain applications without painting being required. The foam and solid materials selected are compatible and will merge or stick together. Generally the same plastics material is utilized and to which coloring may be added while the material is in the extruder as is known in the art.

It should also be understood that a pair of extruders may be used, one for the solid plastics material and the other for the foam plastics material. Thus a strong, durable and shiny solid plastic material may be used for the smooth skin and a less expensive or cheaper plastic material used for the inner core of structure C. As an example, you can use polycarbonate as the skin and styrene as the inner cellular core C.

It should be appreciated that the upper mold part 72 may remain in the press, not shown, and the cores or lower mold parts 70 and 114 shuttled or transferred back and forth to form the mold assemblies 74 and 108 described previously.

The present invention utilizes the same upper mold cavity for making or compression molding the skin or liner L and for integrally forming or molding the cellular core C therewith.

It should be further appreciated that the vertical press utilized may have a sufficient number of mold cavities and mold assemblies to make two articles A and two molded liners L every time the press, not shown, opens. Thus the automatic apparatus and method described may be used with a plurality of mold assemblies in a single press as will be readily understood by a person skilled in the art. Furthermore it is feasible to use horizontal presses instead of vertical presses as described herein.

I claim:

1. A method of making a composite structural homogeneous foam resinous or plastic article having (a) a small, dense, homogeneous or non-cellular relatively thin injection compression molded plastic liner on the outer surface and formed in a mold assembly at a first molding station and (b) a foam or cellular relatively thicker injection molded inner plastic structure or core formed in a mold assembly supporting the outer plastic liner at a second molding station and formed integral with said liner to complete the plastic article comprising the steps of:
   (a) transferring a homogeneous or non-cellular resinous or plastic material from a plasticating extruder means into a first injection chamber;
   (b) transferring a foamable cellular resinous or plastic material from a plasticating extruder means into a second injection chamber;

(c) establishing communication by a passageway having a first valve between said first injection chamber and a first mold assembly having a movable upper mold part and a stationary lower mold part forming the first cavity at a first molding station; said movable upper mold part being adapted to open the mold assembly and form a gap opening therebetween;

(d) opening said first valve and injecting the non-cellular plastic material into the first cavity of the first mold assembly when the gap opening is provided therein;

(e) applying a compressive force to the first mold assembly at said first molding station to close the gap opening of said first mold assembly and to distribute the non-cellular plastic material uniformly throughout said first cavity to form the non-cellular relatively thin outer molded plastic liner;

(f) transferring the movable upper mold part carrying the formed non-cellular relatively thin outer molded liner to a second molding station where the aforesaid upper mold part forms with another stationary lower mold part a second mold assembly which is closed and having a second mold cavity therein which contains in the upper part thereof the previously molded liner;

(g) establishing communication by a passageway having a second valve between said second injection chamber and the second mold cavity at the second molding station;

(h) opening said second valve; and (i) injecting the foamable cellular plastic material from said second injection chamber into said second mold cavity to distribute the foamable cellular plastic material throughout said second mold cavity to form the cellular relatively thicker inner structure provided with said non-cellular plastic liner on the outer surface of the plastic article.

2. The method of making a composite structural homogeneous-foam plastic article of claim 1 wherein the compressive force of step (e) is rapidly applied to the first mold assembly to close the gap opening immediately after the non-cellular plastics material has been injected into the first cavity.

3. The method of making a composite structural homogeneous-foam plastic article of claim 1 wherein the step of injecting the foamable cellular plastic material from said second chamber into said second mold cavity is followed by the step of applying a compressive force at said second molding station to distribute said foamable cellular plastic material.

4. The method of making a composite structural homogeneous-foam plastic article of claim 1 wherein the first and second molding stations are located in the same press.

5. The method of making a composite structural homogeneous-foam plastic article of claim 1 wherein the plastic material of steps (a) and (b) are the same or are of different compositions and are extruded from the same plasticating extruder means.

6. The method of making a composite structural homogeneous-foam plastic article of claim 1 wherein the plastic material of steps (a) and (b) are the same or are of different compositions and are extruded from different plasticating extruder means.

7. Apparatus for molding a composite structural homogeneous-foam resinous or plastic article characterized by a dense, homogeneous or non-cellular relatively thin injection compression molded plastic liner on the outer surface and a foam or cellular relatively thicker injection molded inner plastic structure or core integral with the non-cellular molded liner, the combination comprising;

(a) extruder means having a main passageway comprising a wall surrounding an extruding chamber and plasticizing means associated with said main passageway for heating and plasticating a plastics material while simultaneously causing the plastics material to travel through said passageway from one end toward the other end thereof; said main passageway having a melt zone and a melt and gas mixing zone;

(b) first injection means including a non-cellular plastics injection chamber;

(c) second injection means including a cellular plastics injection chamber;

(d) first passage means connected on one end to the melt zone of said main passageway at a place upstream of said melt and gas mixing zone of said main passageway, said first passage means being connected on the other end thereof to said non-cellular plastics injection chamber;

(e) second passage means connected on one end to the melt and gas mixing zone of said main passageway downstream of the connection of said first passage means to said main passageway, said second passage means being connected on the other end thereof to said cellular plastics injection chamber;

(f) means for introducing a gas or a gas emitting liquid or solid into the melt and gas mixing zone of said main passageway intermediate the connections of said first and second passage means to said main passageway, where the gas mixes with the molten plastics material to form foamed or cellular plastics material;

(g) means for energizing said plasticizing means and first directing the molten non-cellular plastics material through said first passage means to said non-cellular plastics injection chamber for storing same in a measured amount generally corresponding to the molded weight of the non-cellular plastic liner to be formed and second directing the molten cellular plastics material through said second passage means to said cellular plastics injection chamber for storing same in a measured amount generally corresponding to the molded weight of the cellular plastic molded inner structure to be formed integrally with the liner;

(h) a first mold assembly at a first molding station having a movable and transferable upper mold part and a stationary lower mold part forming a first mold cavity;

(i) means including a valve connecting said non-cellular plastics injection chamber to said first mold cavity to form the solid plastic liner;

(j) a second mold assembly formed by the aforesaid upper mold part and another stationary lower mold part at a second molding station and forming a second mold cavity;

(k) means including a second valve connecting said cellular plastics injection chamber to said second mold cavity to form the molded inner structure of the plastic article;

(l) fluid operated means for energizing said first injection means to inject the non-cellular plastics material therein into said first mold cavity;

(m) means for applying a compressive force to said first mold assembly to form the relatively thin injection compression molded plastic liner;

(n) means for transferring said movable upper mold part, with the molded liner supported therein, to said second molding station and forming said second mold cavity; and (o) fluid operated means for energizing said second injection means to inject the cellular plastics material therein into said second mold cavity of said second mold assembly to form the composite plastic article.

8. The apparatus defined in claim 7 wherein a first flow control valve is located in said first passage means, said first valve being opened during the time the non-cellular plastics injection chamber is being filled with non-cellular plastics material, and being closed after the measured amount of non-cellular plastics material has been stored in said non-cellular plastics injection chamber.

9. The apparatus defined in claim 7 wherein said non-cellular plastics injection chamber has a discharge nozzle for delivering the non-cellular plastics material to the first mold assembly, said discharge nozzle extending centrally through an opening provided in the stationary lower mold part of the first mold assembly and communicating with said first cavity.

10. The apparatus defined in claim 7 wherein said second passage means is provided with a second flow control valve which is opened during the time the cellular plastics injection chamber is being filled and is closed after the measured amount of cellular plastics material has been stored in said cellular plastics injection chamber.

11. The apparatus defined in claim 10 wherein the means for introducing a gas or a gas emitting liquid into said main passageway includes a source of a gas or a gas emitting liquid, a variable volume liquid or gas pump having the suction side thereof connected to said source and drive means for energizing said pump and delivering the gas or liquid to said main passageway for mixing with the molten plastics material in the melt and gas mixing zone downstream of the place where said first passage means is connected to said main passageway.

12. The apparatus defined in claim 7 wherein the means for introducing a gas into said main passageway includes a pump, a source of gas inert to said plastics material connected to the suction side of said pump, conduit means connecting the discharge side of said pump to said main passageway downstream of the place where said first passage means joins said main passageway and means for energizing said pump and delivering the inert gas to said main passageway for mixing by said plasticizing means with the molten plastics material to form cellular plastics material.

13. The apparatus defined in claim 7 wherein said plasticating means is an elongated screw positioned within and extending along the extruding chamber of said main passageway.

14. The apparatus defined in claim 7 wherein said fluid operated means operates said first and second injection means sequentially to first direct the non-cellular plastics material from the non-cellular plastics injection chamber to the first mold cavity to make the molded liner and thereafter to direct the cellular plastics material from the cellular plastics injection chamber to the second mold assembly containing the previously molded liner to form the composite article.

15. The apparatus defined in claim 14 for use with a single press containing the first and second mold assemblies into which the plastics material are injected.

16. The apparatus of claim 7 wherein the mold assemblies include controls for rapidly closing same after the plastics material have been injected therein.

17. The apparatus of claim 7 wherein means are provided for moving the upper mold part, with the molded liner, from the first molding station to the second molding station and vice versa upon completion of the finished article.

18. The apparatus of claim 7 wherein means are provided for applying a compressive force to said second mold assembly to form the composite plastic article.

* * * * *